A. SINDING-LARSEN.
PROCESS OF MAKING NITROGEN COMPOUNDS INCLUDING NITRIDS AND AMMONIA.
APPLICATION FILED MAR. 26, 1910.
1,042,723. Patented Oct. 29, 1912.
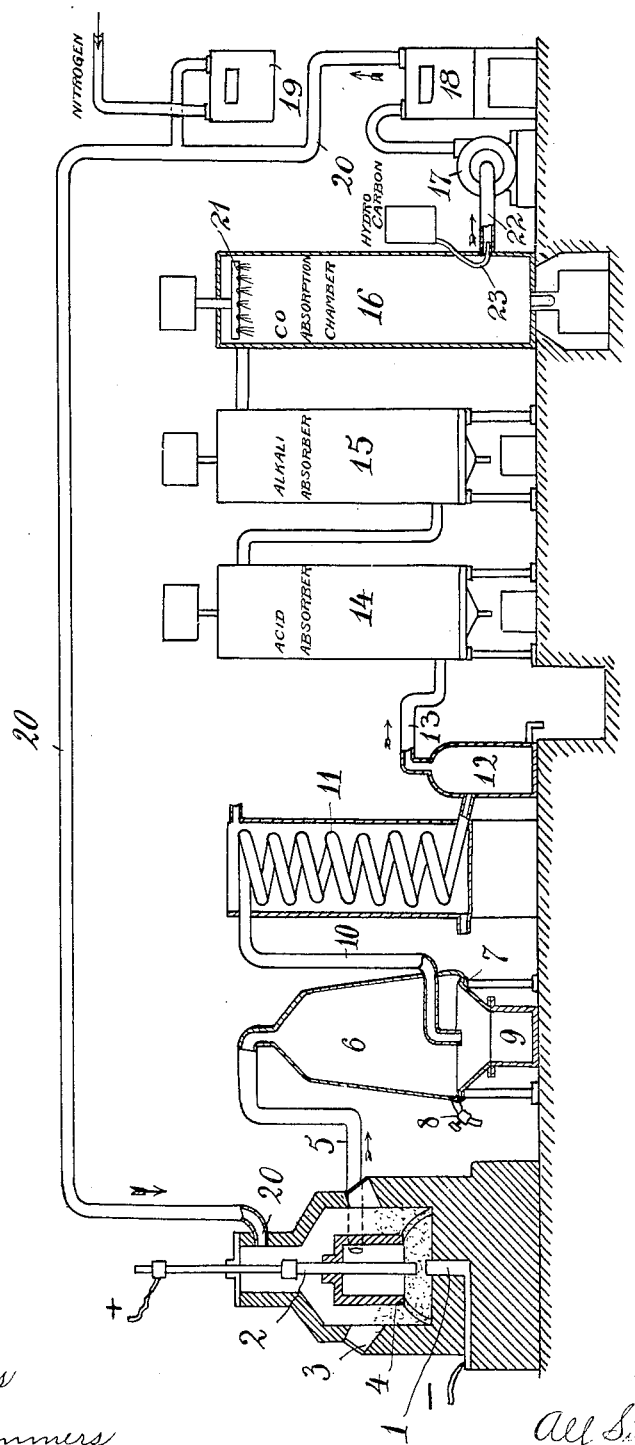

UNITED STATES PATENT OFFICE.

ALF SINDING-LARSEN, OF CHRISTIANIA, NORWAY, ASSIGNOR OF ONE-HALF TO STORM, BULL & CO., OF CHRISTIANIA, NORWAY.

PROCESS OF MAKING NITROGEN COMPOUNDS INCLUDING NITRIDS AND AMMONIA.

1,042,723.  Specification of Letters Patent.  Patented Oct. 29, 1912.

Application filed March 26, 1910. Serial No. 551,680.

*To all whom it may concern:*

Be it known that I, ALF SINDING-LARSEN, a subject of the King of Norway, residing at Christiania, Norway, have invented certain new and useful Improvements in Processes of Making Nitrogen Compounds Including Nitrids and Ammonia; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the production of nitrogen compounds, and has for its object a process of obtaining such compounds by the action of nitrogen upon various minerals.

As is well known, most metals and also some metalloids such as occur in the most common minerals may under certain circumstances be directly transformed into nitrogen compounds. Said nitrogen compounds may be in part nitrids of various character (mononitrids, dinitrids, &c.) in part compounds of the cyanamid group, and in part other compounds of various constitution and different contents of nitrogen. As examples of the minerals I use may be mentioned feldspar, quartz, kaolin, apatite, limestone, dolomite, etc., and such more complicated or composite minerals as granite, &c., which contain some of the above mentioned minerals.

The present invention relates to a method, by which these minerals or their constituents may easily be made to take up a considerable quantity of nitrogen, and thereby produce products, which may be used directly for fertilizing purposes and also for the production of other nitrogen compounds. At the same time the method renders it possible to utilize also some of the constituents of the above-mentioned minerals, as for instance, the content of alkali of the feldspar.

The method consists in vaporizing the minerals mentioned in an atmosphere, which contains in addition to nitrogen, sufficient reducing agent, such as hydrocarbon, which is in the state of vapor or gas at the temperature in question. The products obtained, whether these are in the state of vapors, gases or dust, are led away and collected in suitable manner. Thus, the dust-like products may at first be separated in suitable separating chambers and then the gaseous products may be absorbed in chambers or towers, where they are brought in touch with some suitable absorbing material. The vaporous products also may be removed almost entirely, as receivers may be arranged in such a way as to bring about a fractional distillation or sublimation. The solid products obtained in this manner, and which may contain in part nitrogen compounds indifferent to water, in part nitrogen compounds decomposable in water, and in part compounds soluble in water, for instance, alkalis, can be lixiviated with water, and the solution obtained be treated further in suitable manner by neutralization, precipitation, vaporization, &c.

The accompanying drawing illustrates diagrammatically an arrangement of apparatus for carrying the process into effect.

The electrical furnace, the electrodes of which are denoted by 1 and 2, has openings 3 for introducing the charge. The lower portion of the electrode 2 is inclosed by a bell 4, which is open at the bottom and from which a tube 5 leads out of the furnace for discharging gaseous reaction products. When the furnace is working for example at a temperature of 2500° C., the gas mixture introduced through the pipe 20 is preheated on passing down around the bell 4 and will be forced through the charge, and, together with vapors from the latter, will gather in the bell 4, where the final reaction between the vapors formed and the nitrogen will take place, nitrogen compounds of various compositions being formed. If the charge consists of potassium feldspar, there will essentially be formed nitrids of aluminium, of silicon, and, it may be, also of potassium, besides hydrocyanic acid, cyanids, cyanamids, &c., according to the relative quantities of gases introduced, the temperature of the furnace, the speed of the flow of gas, and other circumstances. From the bell 4 the reaction products pass through the tube 5 into a container 6, in which the less volatile constituents are separated or condensed, some to a liquid, and some to a solid state. The liquid substances will deposit themselves on the walls of the container and flow down along the same into the annular collector 7, from where they may be drawn off through the cock 8. The sublimated solid substances will sink down through the middle portion of the container and gather in the exchangeable, box-shaped bottom portion 9 of the same. In this container 6 will thus be deposited the greater part of the aluminium nitrid and the silicon nitrid. From the container 6 the flow of gas which at this point may have a temperature of about 300° C., passes on through a tube 10 into a cooler 11, where the more volatile constituents, such as water, and the gases soluble in water, such as ammonia, hydrocyanic acid, etc., deposit themselves and gather in the receiver 12. The temperature of the cooling medium may be kept at about 50° C. The gases not yet condensed thereupon pass through a tube 13 into an alkaline absorption chamber 14 for the acid volatile compounds such as HCN, &c., and thence into an acid absorption chamber 15 for the alkaline compounds, as ammonia, amids, &c. From the chamber 15 the gas, which will now substantially consist of carbon monoxid and some nitrogen and other indifferent gases, is sucked into a collecting and mixing chamber 16, where volatile hydrocarbons are added, CO being at the same time absorbed in a suitable liquid, such as a solution containing hemoglobin, as blood, or of cuprous chlorid. The absorption liquid is supplied at the top of the chamber 16 and flows through the latter from sprinkler pipes 21. The hydrocarbon may be injected at any suitable point, for example at the gas outlet 22, by an injector 23. The gas is then sucked out of the container 16, by a fan 17, and is forced through a meter 18 into the pipe 20 leading to the electric furnace. The necessary quantity of nitrogen is likewise introduced through a meter 19 in the pipe 20, where it mixes with the hydrocarbon-containing gas from the meter 18.

The arrangement of apparatus shown in the drawing has only been chosen as an example and can of course be modified in various ways, and also the charge and reduction agents employed may be of a different kind from those chosen in the example.

I claim—

1. The process of producing nitrogen compounds, consisting in vaporizing a mineral or rock and subjecting the vapors to the action of reducing gases or vapors in the presence of nitrogen.

2. The process of producing nitrogen compounds, consisting in vaporizing a mineral or rock and subjecting the vapors to the action of reducing gases or vapors in the presence of nitrogen, treating the obtained products with water to lixiviate the content of such substances which are soluble or decomposable in water, neutralizing the obtained solution, and treating the solution to recover ingredients.

3. The process of producing nitrogen compounds, which comprises vaporizing a mineral or rock, subjecting said vapors simultaneously to the action of nitrogen and reducing gases and separating the solid and liquid constituents of the products thus formed, and then successively separating the acid and alkaline gaseous constituents.

4. The process of producing nitrogen compounds, which comprises vaporizing a mineral or rock, subjecting said vapors to the simultaneous action of nitrogen and a reducing gas, separating the solid, liquid and part of the gaseous products resulting from the reaction, adding a reducing agent and nitrogen to the remaining gaseous products, and returning them for action on said vapors.

In testimony that I claim the foregoing as my invention, I have signed my name in presence of two subscribing witnesses.

ALF SINDING-LARSEN.

Witnesses:
HENRY BORDENWICH,
MARTIN GULLORMSEN.